June 21, 1960

R. ZECHNALL ET AL 2,941,519

FUEL INJECTION SYSTEM

Filed Dec. 1, 1958

INVENTORS:
RICHARD ZECHNALL
HEINRICH KNAPP.

BY MICHAEL S. STRIKER

ATTORNEY

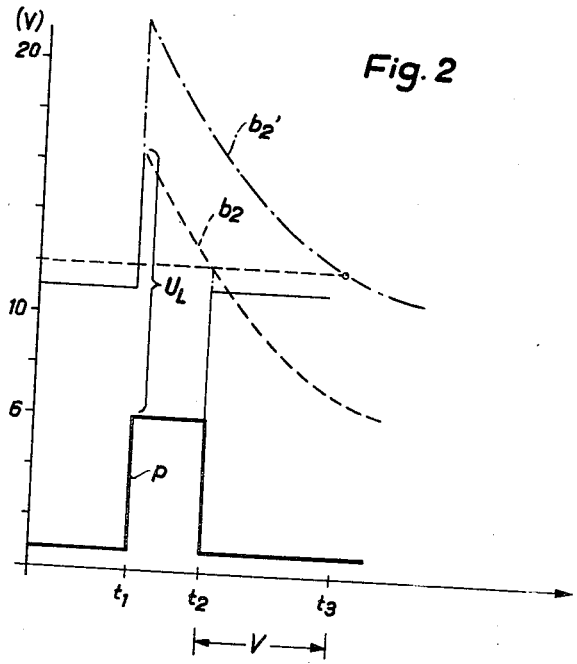
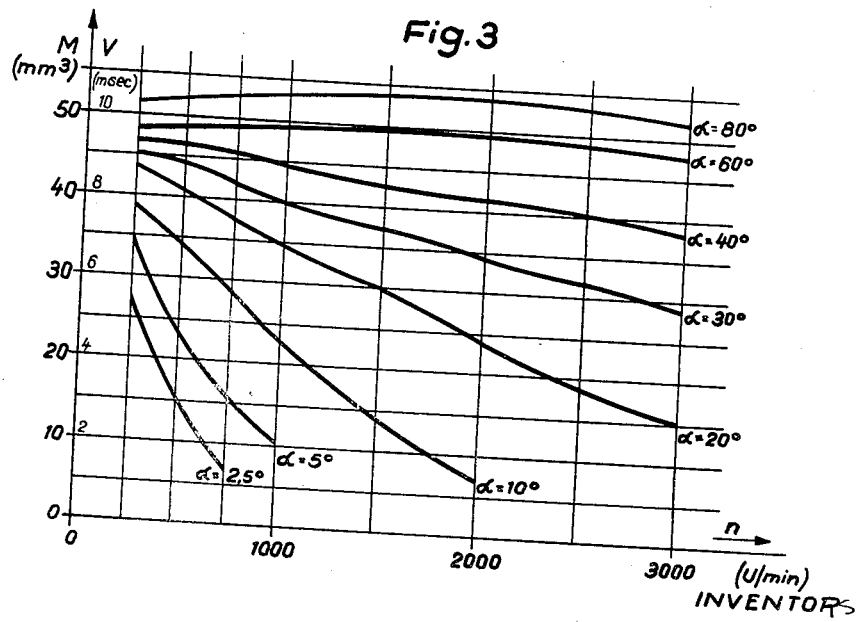

United States Patent Office 2,941,519
Patented June 21, 1960

2,941,519

FUEL INJECTION SYSTEM

Richard Zechnall and Heinrich Knapp, Stuttgart, Germany, assignors to Robert Bosch, G.m.b.H., Stuttgart, Germany Filed Dec. 1, 1958, Ser. No. 777,369

Claims priority, application Germany Dec. 7, 1957

12 Claims. (Cl. 123—32)

The present invention concerns fuel injection systems as they are required for the operation of internal combustion engines operated by an external ignition control device, particularly such systems as related to motor cars. More specifically, the present invention concerns a fuel injection system in which the fuel injection rate is determined by control means which are timed during operation in proportion to the actual rotational speed of the engine.

In fuel injection systems of this type the fuel injection rate i.e. the amount of fuel injected per rotational cycle of the internal combustion engine must be regulated in proportion to the air intake rate of the engine. For various purposes it is desirable that, when the engine works under partial load, the fuel injection rate decreases as the rotational speed of the engine increases. However, when the throttle is fully opened then the fuel injection rate should remain practically unchanged over the entire range of rotational speeds.

It is therefore a main object of this invention to provide for a speed-responsive fuel injection system for internal combustion engines which is capable of operating a fuel injection device in such a manner that the injection admission rate is regulated in a predetermined proportion to the rotational speed and to the air intake rate of the internal combustion engine.

It is another object of this invention to provide for a fuel injection system of the type set forth which is composed of comparatively simple components so as to give reliable and accurate service for a long period of time.

With above objects in mind a speed-responsive fuel injection system for an internal combustion engine comprises according to the invention mainly timing means adapted to be actuated by the ignition control device of the internal combustion engine for producing a sequence of electrical impulses in synchronism with the operational frequency of said ignition control device so that the pulse frequency of said impulses is proportional to the rotational speed of said engine, said timing means including electrical means capable of producing and varying a control potential depending upon the rotational speed of said engine. The system further comprises electrically controllable fuel injection means adapted to be controlled by said control potential furnished and varied by said electrical means in such a manner that the injection admission rate of said fuel injection means is determined by said control potential of said electrical means; and actuating means in circuit with said timing means and with said electrically controllable fuel injection means for time controlling the operation of the latter, whereby the injection admission rate of the fuel injection means is regulated in a predetermined proportion to the rotational speed of the internal combustion engine.

In a more specific embodiment of the invention the above mentioned electrical means comprise an auxiliary generator producing a voltage of predetermined frequency, an electromagnetic coupling element the coupling effect of which can be regulated mechanically, inductor means controlled by said coupling element for transmitting the output of the generator in varying degrees to a rectifier device which, in turn, influences the timing of the timing means. Preferably the timing means comprise a transistor equipped flip-flop device the time characteristic of the latter concerning the time interval between its being changed from a stable condition to an unstable condition and its being changed back from its unstable condition to its stable condition being determined by said control potential. The above mentioned coupling element preferably comprises an eddy current actuated rotary coupling one element of which is rotated at a speed proportional to that of the engine, and whose degree of coupling depends upon a control movement associated with the movements of the throttle valve of the engine, and the above mentioned inductor means preferably comprise a variometer arrangement operated by said electromagnetic coupling means in such a manner that depending upon its various positions a greater or smaller portion of the voltage produced by the generator is transmitted and applied to the flip-flop device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is a graph having time as abscissa and voltage as ordinate for illustrating the operation of the device; and Fig. 3 is another graph having revolutions per minute as abscissa and volume of injected fuel as well as time as ordinate, the curves in the graph illustrating the corresponding angular positions or deflections of the throttle valve of the engine.

Figure 1:
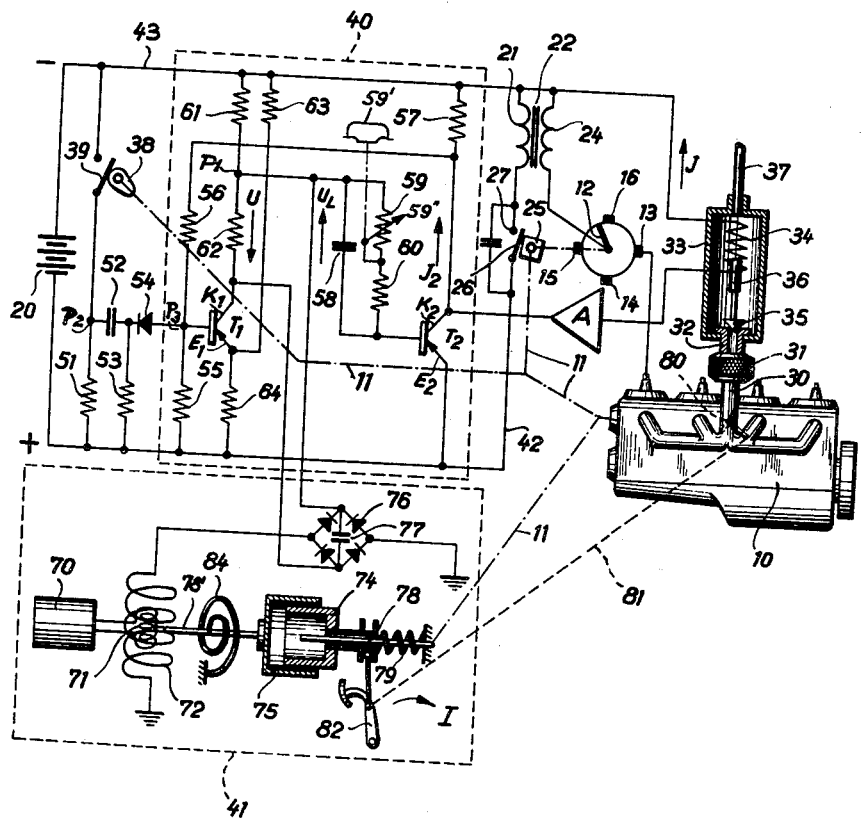
Fig. 1 is a schematic diagram of an embodiment of the invention showing the circuit arrangements of the timing means and the actuating means of this system together with a diagram of the ignition control device, the electrically controllable fuel injection means and of the internal combustion engine.

It should be understood that the speed-responsive fuel injection system according to the present invention is akin to the system disclosed in the copending patent application Serial No. 776,608, filed by Kurt Paule and Heinrich Knapp on November 26, 1958. While the ultimate object and purpose of the fuel injection system according to this invention and those of the fuel injection system according to the copending application are the same, and while certain components in both systems are similar to each other, a basic difference exists between the two systems. In the copending application a control potential is obtained by converting the pulses derived from the ignition control device into a potential varying with the rotational speed of the engine, in the system according to the present invention an auxiliary potential is produced by generator means and modified to various degrees in proportion with the rotational speed of the engine. Other characteristic differences between the two systems mentioned above will appear from the following description of a preferred embodiment of the present invention.

Referring now to Fig. 1, the fuel injection system as illustrated is designed to operate a four-cylinder internal combustion engine 10 the cam shaft whereof is operatively connected with the distributor shaft 11 of a high voltage ignition device. In order not to encumber the circuit diagram of Fig. 1, the distributor shaft 11 is indicated by dash-dotted lines connecting the various elements which are jointly rotated by the rotation of this shaft. The ignition control device as shown comprises a distributor including a rotating distributor electrode 12, four stationary electrodes 13, 14, 15, 16, and ignition coil having a primary winding 21 mounted on an iron core 22 and connected in circuit with a battery 20, and a high voltage winding 24, moreover an interrupter device comprising an interrupter cam 25 and an interrupter switch arm 26 operated by said cam so as to be moved into contact position with a corresponding stationary contact 27 which is connected to negative ground through the primary winding 21.

The air intake pipe 30 of the engine is provided with an air inlet 31, and the fuel injection means communicate with the air inlet 31. The fuel injection means comprise a chamber 33 which is supplied with fuel under substantially constant pressure through a supply pipe 37. At the opposite end of the chamber 33 a nozzle 32 leads to the air inlet 31. A valve cone 35 is mounted axially movable within the chamber 33 and carries at its rear end an armature member 36 movable axially within solenoid coil 34. It is evident that normally the cone 35 closes the nozzle 32. However when sufficient electric current is caused to flow through the solenoid 34 for lifting the armature 36 and the valve cone 35 fuel will flow through the nozzle 32 as long as the cone 35 is kept in raised position. The longer the time interval through which the valve cone 35 is kept in raised position the more fuel will be supplied through the nozzle 32 to the engine.

For operating the fuel injection device and for regulating the fuel admission rate in proportion to the prevailing operating conditions of the engine, the electrical equipment described below is used.

The electrical timing device according to the invention comprises first of all a monostable flip-flop device 40 and a time control device 41 which two main components are surrounded in Fig. 1 by dotted lines. The flip-flop device is intended to operate in such a manner that after it has been changed to its unstable condition, it furnishes a current impulse J to the solenoid 34, the duration of this current impulse being variable, and being terminated when the flip-flop device returns to its stable condition automatically as soon as a certain control impulse ceases by which it had been brought into its unstable condition. In other words, as long as the flip-flop device is in its unstable condition, the injection valve 35 will be kept in open position. On the other hand, the unstable condition of the flip-flop device can only be maintained until a normally charged condenser forming part of the flip-flop device and forming together with resistors of the flip-flop device and with the condenser, a timing element, connected in parallel with the condenser, has discharged. The time control device 41 furnishes a control voltage which is varied depending upon the rotational speed of the engine in such a manner that the time interval between the change of the flip-flop device from stable condition to unstable condition and its change back from unstable condition to stable condition is thereby determined or at least influenced.

The flip-flop device 40 is operated from a battery 20 via a common positive polarity line 42, while a common negative polarity line 43 is connected to ground and to the minus terminal of the battery 20. The flip-flop device is controlled and operated in synchronism with the rotational speed of the engine 10 by the action of the cam member 38 rotating with the distributor shaft 11 which cam controls the associated switch arm 39. The latter is connected in series with a resistor 51 of e.g. approximately 20,000 ohms between the positive line 42 and the ground connection 43. Connected to a junction point P2 between the switch 39 and the resistor 51 is a coupling condenser 52 of e.g. 1,000 micromicrofarads to the other side of which is connected a resistor 53, on one hand, and a germanium diode 54. The other terminal of the diode is connected with the base of a transistor T1 forming part of the flip-flop device 40. Between a junction point P3 between said diode and said base and the positive line 42 a further resistor 55 of e.g. 5,000 ohms is connected, while still another resistor 56 is connected between the junction point P3 and the collector K2 of a second transistor T2 belonging also to the flip-flop device. The collector K2 is connected via a resistor 57 of e.g. 5,000 ohms with the ground connection 43 while the emitter E2 is directly connected with the positive line 42.

A timing element in the flip-flop device 40 consists of a condenser 58 and a series combination of resistors 59 and 60, connected in parallel with the condenser, the whole timing circuit being connected between the base of the transistor T2 and the junction point P1 between two further resistors 61 and 62 which are connected in the collector line of the transistor T1. The resistor 61 has a value of e.g. 5,000 ohms and is connected at one end with the grounded line 43 while the resistor 62 has a value of only e.g. 1,200 ohms and is connected with the collector K1 of the transistor T1. Still another resistor 63 of e.g. 5,000 ohms is connected between the emitter E1 of the transistor T1 and the ground connection 43, and finally an emitter resistor 64 of e.g. 500 ohms is connected to the positive supply line 42.

The resistor 59 of the timing circuit of the flip-flop device 40 is variable depending upon the temperature of the ambient air and its control member 59″ is operated by a device, for instance a diaphragm device 59′, while the other resistor 60 is a fixed resistor. Assuming that the capacity of the condenser 58 is 0.1 μf., the series resistance value of the resistors 59 and 60 should not exceed 150,000 ohms.

The time control device 41 according to the invention comprises an auxiliary A.C. generator 70 producing a voltage with a frequency of 1,000 cycles per second and a variometer having one rotatable coil 71 and a fixed or stationary coil 72. The latter has a larger diameter than the rotatable coil 71 so that the latter may be turned within the coil 72. The rotatable coil 71 is carried by the shaft 78′ of an eddy current actuated coupling device mainly consisting of a rotatable permanent magnet 74 carried by the shaft 78 driven by the distributor shaft 11, and a cup-shaped outer member 75 mounted on the shaft 78′. A coil spring 84 mounted between the shaft 78′ and a stationary support tends to turn the member 75 from any displaced position into a normal position. In addition the device 41 contains a full wave rectifier 76 connected between the coil 72 and ground, the rectifier containing a smoothing condenser 77 connected diagonally across the rectifier. The condenser 77 and the diagonally opposite terminals of the rectifier 76 are connected in parallel with the above mentioned resistor 62 located in the collector line of the transistor T1.

The drum-shape permanent magnet 74 is mounted on the shaft 78 in such a manner that it can be shifted in axial direction while being rotated by the shaft 78. A compression spring 79 urges the magnet 74 in a direction toward the cup-shape member 75 so that the magnet 74 always tends to penetrate as deeply as possible into the cup 75. The pedal 82 which is operatively connected by means 81 indicated only by a dotted line, with the throttle 80 in the air intake line 30 of the engine, is also operatively connected with the means which carry the magnet 74 on the shaft 78 so that whenever the pedal 82 is turned in the direction of the arrow I so as to open to a greater or lesser degree the throttle 80, the magnet 74 is moved against the action of spring 79 in a direction away from the cup member 75.

It is therefore clear that when the magnet 74 is rotated indirectly by the cam shaft of the engine so that it moves relatively to the cup member 75 which is held in normal position by the spring 84, the magnetic field of the magnet will pass the cup member 75 and produce therein eddy currents which cause the cup member 75 and together with it the coil 71 of the variometer to turn against the action of the spring 84 to such a degree that it may deviate from its normal position up to 90° in the direction of rotation of the magnet 74. As is known from the behavior of variometer devices, the greater the angle of turn of the rotatable coil 71 the smaller is the portion of the voltage furnished by the generator 70 which is transmitted to the stationary coil 72, and the resulting variable control voltage U is then supplied to the rectifier 76. The rectified voltage U is then applied across the resistor 62 of the flip-flop device and serves to determine and control the time through which the injection valve 55 remains open and hereby determines the fuel injection rate used in the operation of the engine.

For understanding the following description of the operation of the whole system it must be understood that the timing circuit comprising the condenser 58 and the series combination of resistors 59 and 60 connected in parallel with the condenser, is so adjusted that the time interval between the changes of the flip-flop device from stable condition to unstable condition and back from unstable condition to stable condition corresponds to the time required for the solenoid valve 33—35 to react to an impulse J, provided that no control voltage has been applied to the resistor 62 by the time control device 41.

In practice the flip-flop device 40 operates as follows: As is described in detail in the co-pending application Serial No. 776,608 as long as during the rotation of the cam 38 the switch arm 39 is in its open position, the transistor T1 is non-conductive and the transistor T2 is conductive. Referring to the above indicated values of the various components in the present example, the potential $k2$ at the collector $K2$ of the transistor T2 is, during this phase of the operation, approximately 10 volts because it is assumed that the battery 20 delivers 12 volts. Consequently, the potential $b1$ at the base of the transistor T1 is determined by the resistors 55 and 56 to be 11.3 volts. Then the potential $e1$ at the emitter $E1$ of the transistor T1 is determined by the resistors 63 and 64 to be 10.9 volts. Since now the potential $b1$ is higher than the emitter potential $e1$, no control current can flow from the emitter E1 to the base of the transistor T1. Thus, the transistor T1 is non-conductive.

Under these circumstances the potential $p$ at the junction point P1 is practically determined now only by the voltage drop which is caused across the resistor 61 by the base current flowing from the base of the transistor T2 via the resistors 60, 59 and 61.

Under the above stated condition that the control voltage U applied to the resistor 62 is equal 0, the base potential $b2$ of the transistor T2 is approximately 11 volts. Assuming further that the value of the fixed resistor 60 is 60,000 ohms and that in a particular moment the adjusted value of the pressure controlled variable resistor 59 is 15,000 ohms, then a potential of approximately 0.7 volt appears at the junction point P1 while the voltage drop across the series resistors 60 and 59 is approximately 10.3 volts. Consequently, the condenser 58 is charged to this potential of 10.3 volts when the switch arm 39 is in open position and the transistor T1 is consequently in non-conductive condition.

However, as soon as the cam 38 moves the switch arm 39 into its closed position, the base potential $b1$ of the transistor T1 is momentarily lowered via the discharge coupling condenser 52 for a short period of time to approximately 0 because the condenser 52 constitutes in the moment of the closing of the switch 39 practically a short circuit. Only now a control current can flow from the emitter E1 of the transistor T1 to its base so that the transistor T1 is rendered conductive to such a substantial degree that its collector current rises to approximately 1.2 ma. and that the potential $p$ at the junction point P1, to which the condenser 58 forming part of the timing circuit is connected, rises to a value of approximately 6 volts. Since in this instance the last mentioned condenser still is charged to its full charging potential $U_L$ maximum of 10.3 volts, the potential $b2$ at the base of the transistor T2 is raised above the emitter potential $e2$ of 12 volts, namely to the sum of $p+U_L$ i.e., 16.3 volts; since in the presence of so high a base potential no control current can flow from the emitter E2 to the base of the transistor T2, the transistor T2 is non-conductive. The collector potential $k2$ of this transistor is now 3 volts which potential is practically determined only by the current flowing through the resistors 56, 55 and 57. This current produces across the resistor 55 connected between the positive line 42 and the base of the transistor T1 a voltage drop which is sufficient for maintaining the transistor T1 in conductive condition even after the switch arm 39 has been moved into open position and the current impulse across the meanwhile recharged coupling condenser 52 has terminated.

The flip-flop device 40 returns into its original stable condition when the condenser 58 which is a part of the timing circuit, has discharged from its original charge potential $U_L$ of 10.3 volts to such an extent that the potential $b2$ of the base of the transistor T2 has decreased below the value of the emitter $e2$ amounting to 12 volts. As soon as this occurs the transistor T2 becomes conductive.

The graph Fig. 2 illustrates the above described operation. Up to the moment $t1$ in which the switch arm 39 is moved into closed position, the base of the transistor T2 maintains its potential $b2$ in the amount of 11 volts without change, but it jumps at the moment $t1$ to the value 16.3 volts. Since from this moment on no base current can flow through the transistor T2 via the resistors 59 and 60, the condenser 58 of the timing circuit discharges, the speed of this discharge being determined by the magnitudes of the resistors 59 and 60. Thus the charge potential $U_L$ decreases rapidly as illustrated by the exponential curve $b2$. In this manner the condenser potential drops finally below the value of the emitter potential amounting to 12 volts and this occurs at the moment marked $t2$. At this moment the transistor T2 becomes again conductive.

Since the injection control means, particularly the valve 35 does not immediately and instantly open at the time $t1$ but follows only after a delay of several milliseconds due to the fact that the electromagnetic field for lifting the iron core 36 must be built up, the arrangement is such that the change-over time of the flip-flop device between the time moments $t1$ and $t2$ is equal to the delay caused by the response of the solenoid valve. The time control device described below serves to extend to prolong the current impulses furnished to the solenoid valve beyond the time $t2$ so that the fuel injection device is capable of delivering to the engine those amounts of fuel at a rate which corresponds to the operating conditions and requirements of the engine under various circumstances.

The graph Fig. 3 illustrates the relation between the required volume of fuel to be injected and the required prolonged interval between the conditioned changes of the flip-flop device, as a function of the rotational speed of the engine in r.p.m. and of various degrees of opening the throttle valve of the engine. The various curves associated with a variety of angular openings of the throttle are plotted so that every point of these curves illustrates the required amount of fuel to be injected at certain speeds of the engine relative to the above-mentioned throttle openings. It can be seen that when the opening angle $\alpha$ of only 2.5° is used, the required volume of fuel injection per cycle amounting to approximately 28 mm.³ at 250 r.p.m. must be reduced to about 7 mm.³ at 750 r.p.m. Correspondingly, the valve 35 must be kept open about 5.7 milliseconds at 250 r.p.m., while the duration of the open condition of the valve must be reduced at 750 r.p.m. to only 1.4 milliseconds. On the other hand, for instance, the required volume of fuel remains practically unchanged over the entire range of possible rotational speeds provided that the throttle is fully or almost fully opened since the diagram shows that at α=80° the fuel volume remains at 52 to 53 mm.³, and at an angle α=60° it remains between 48 and 49 mm.³.

The relation between the required fuel admission rate, rotational speed and throttle opening illustrated in Fig. 3 is automatically established in the system according to the invention by the time control device 41. The more the pedal 82 is tilted in the direction of the arrow I for increasingly opening the throttle 80, the more the drum-shaped permanent magnet 74 of the eddy current actuated electromagnetic coupling is moved from its normal position within the cup member 75 in outward direction. The more it is moved in this direction the smaller is the torque which is exerted on the cup member 75 so that in the case of high rotational speeds of the engine the cup member 75 will not or only insignificantly move the turnable coil 71 from its normal position within the stationary coil 72 into a turned position. Therefore, in the case of high rotational speeds the full output of the auxiliary high frequency generator 70 is applied to the electrifier 76 and after rectification produces across the resistor 62 a control voltage U which will be the lower the deeper the magnet 74 penetrates into the cup 75 because in this case a greater torque is applied to the coil 71 against the action of the spring 84. If the coil 71 is turned a full 90° only a very insignificant amount of the high frequency output of the generator 70 is transmitted to the rectifier 76.

The above mentioned control voltage U is so applied to the collector circuit of the transistor T1 that the potential $p$ appearing at the junction point P1 upon closing the contact 39 is raised by the amount of the applied control voltage U. If for instance at full load operation of the engine and highest speed the control voltage amounts to 5 volts the potential $b2$ at the base of the transistor T2 is raised to the value $b2'$ equal to 21.3 volts as is indicated in Fig. 2. From this maximum value it drops due to the discharge of the condenser 58 with the above mentioned speed but drops below the emitter potential only at the time $t3$ which is situated on the abscissa at a distance V. This particular example is illustrated in Fig. 2 by the dash-dotted line $b2'$ which is located 5 volts above the previously discussed line $b2$ which is drawn in dotted lines and corresponds to a value of control potential U equal to 0. Evidently, the smaller the control voltage U applied to the rectifier 76 and to the collector resistor 62, the earlier the transistor T2 returns to its conductive condition and thereby terminates the injection operation.

It should be noted and understood that the advantage of the system described above consists in the fact that by means of the eddy current actuated electromagnetic coupling a control voltage can be derived from the auxiliary generator 70 and can be varied practically without the occurrence of any friction between parts and therefore without wear of the control elements so that also the inertia of the whole control arrangement can be kept very low.

It will be understood that each of the elements described above, or two or more together, may also find a useful application in other types of fuel injection systems differing from the types described above.

While the invention has been illustrated and described as embodied in speed-responsive fuel injection system for an internal combustion engine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A speed-responsive fuel injection system for an internal combustion engine having an ignition control device, comprising, in combination, a source of electrical energy; timing means adapted to be actuated by the ignition control device of the internal combustion engine for producing a sequence of electrical impulses in synchronism with the operation frequency of the ignition control device so that the pulse frequency of said impulses is proportional to the rotational speed of said engine, said timing means including electrical means capable of producing and varying a control potential depending upon the rotational speed of said engine and upon the air intake rate thereof; electrically controllable fuel injection means in circuit with said source of energy adapted to be controlled by said control potential furnished and varied by said electrical means in such a manner that the injection admission rate of said fuel injection means is determined by said control potential of said electrical means; and actuating means in circuit with said timing means and with said electrically controllable fuel injection means for time controlling the operation of the latter, whereby said injection admission rate of said fuel injection means is regulated in a predetermined proportion to the rotational speed and to the air intake rate of said internal combustion engine.

2. A speed-responsive fuel injection system for an internal combustion engine having an ignition control device, comprising, in combination, a source of electrical energy; first timing means adapted to be actuated by the ignition control device of said internal combustion engine for producing a sequence of electrical impulses in synchronism with the operational frequency of the ignition control device so that the pulse frequency of said impulses is proportional to the rotational speed of said engine, said first timing means including monostable flip-flop means operatively connected with the ignition control device for being sequentially changed by said impulses from its normal stable condition to its unstable condition in synchronism with the operational frequency of the ignition control device; second timing means operatively connected with said flip-flop means and adapted to be actuated by said engine for controlling the time interval after which said flip-flop means is to return from its said unstable condition to its stable condition, said second timing means including electrical means capable of producing and varying a control potential for controlling said time interval depending upon the rotational speed of said engine; electrically controllable fuel injection means in circuit with said source of energy and adapted to be controlled by said control potential furnished by said electrical means in such a manner that the injection admission rate of said fuel injection means is determined by said time interval controlled by said control potential of said electrical means; and actuating means in circuit with said second timing means and with said electrically controllable fuel injection means for time controlling the operation of the latter, whereby said injection admission rate of said fuel injection means is regulated in a predetermined proportion to the rotational speed of said internal combustion engine.

3. A speed-responsive fuel injection system for an internal combustion engine having an ignition control device, comprising, in combination, a source of electrical energy; first timing means adapted to be actuated by the ignition control device of said internal combustion engine for producing a sequence of electrical impulses in synchronism with the operational frequency of the ignition control device so that the pulse frequency of said impulses is proportional to the rotational speed of said engine, said first timing means including monostable flip-flop means operatively connected with the ignition control device for being sequentially changed by said impulses from its normal stable condition to its unstable condition in synchronism with the operational frequency of the ignition control device, said flip-flop means including transistor means and timing elements in circuit therewith for furnishing a current impulse of predetermined duration during a time interval during which said flip-flop means is in its unstable condition; second timing means operatively connected with said flip-flop means and adapted to be actuated by said engine for prolonging said time interval after which said flip-flop means is to return from its said unstable condition to its stable condition, said second timing means including electrical means capable of producing and varying a control potential for prolonging said time interval depending upon the rotational speed of said engine; electrically controllable fuel injection means in circuit with said source of energy and adapted to be controlled by said control potential furnished by said electrical means in such a manner that the injection admission rate of said fuel injection means is determined by said time interval controlled by said control potential of said electrical means; and actuating means in circuit with said second timing means and with said electrically controllable fuel injection means for time controlling the operation of the latter, whereby said injection admission rate of said fuel injection means is regulated in a predetermined proportion to the rotational speed of said internal combustion engine.

4. A speed-responsive fuel injection system for an internal combustion engine having an ignition control device, comprising, in combination, a source of electrical energy; first timing means adapted to be actuated by the igniton control device of said internal combustion engine for producing a sequence of electrical impulses in synchronism with the operational frequency of the ignition control device so that the pulse frequency of said impulses is proportional to the rotational speed of said engine, said first timing means including monostable flip-flop means operatively connected with the ignition control device for being sequentially changed by said impulses from its normal stable condition to its unstable condition in synchronism with the operational frequency of the ignition control device, said flip-flop means including transistor means and timing elements in circuit therewith for furnishing a current impulse of predetermined duration during a time interval during which said flip-flop means is in its unstable conditon; second timing means operatively connected with said flip-flop means and adapted to be actuated by said engine for prolonging said time interval after which said flip-flop means is to return from its said unstable condition to its stable condition, said second timing means including electrical means comprising auxiliary voltage supply means connected in circuit with said transistor means and with said timing elements for furnish said control potential thereto and variometer means for varying said control potential so as to prolong said time interval in proportion to the rotational speed of said engine; electrically controllable fuel injection means in circuit with said source of energy and adapted to be controlled by said control potential furnished by said electrical means in such a manner that the injection admission rate of said fuel injection means is determined by said time interval controlled by said control potential of said electrical means; and actuating means in circuit with said second timing means and with said electrically controllable fuel injection means for time controlling the operation of the latter, whereby said injection admission rate of said fuel injection means is regulated in a predetermined proportion to the rotational speed of said internal combustion engine.

5. A system as claimed in claim 4, wherein said auxiliary voltage supply means comprise generator means for furnishing a high-frequency voltage, and rectifier means connected therewith for delivering a rectified control voltage to said transistor means and timing elements.

6. A system as claimed in claim 5, wherein said generator means is constructed to produce an A.C. voltage within a frequency range between 1,000 and 10,000 cycles per second.

7. A speed-responsive fuel injection system for an internal combustion engine having an ignition control device, comprising, in combination, a source of electrical energy; first timing means adapted to be actuated by the ignition control device of said internal combustion engine for producing a sequence of electrical impulses in synchronism with the operational frequency of the ignition control device so that the pulse frequency of said impulses is proportional to the rotational speed of said engine, said first timing means including monostable flip-flop means operatively connected with the ignition control device for being sequentially changed by said impulses from its normal stable condition to its unstable condition in synchronism with the operational frequency of the ignition control device, said flip-flop means including transistor means and timing elements in circuit therewith for furnishing a current impulse of predetermined duration during a time interval during which said flip-flop means is in its unstable conditon; second timing means operatively connected with said flip-flop means and adapted to be actuated by said engine for prolonging said time interval after which said flip-flop means is to return from its said unstable condition to its stable condition, said second timing means including electrical means comprising auxiliary voltage supply means connected in circuit with said transistor means and with said timing elements for furnishing said control potential thereto, variometer means for varying said control potential so as to prolong said time interval in proportion to the rotational speed of said engine, and variable torque transmitting means operatively connected between said variometer means and a rotary member of said engine for turningly adjusting said variometer means to a predetermined degree by applying a torque derived from said rotary member in proportion to the rotary speed of said engine; electrically controllable fuel injection means in circuit with said source of energy and adapted to be controlled by said control potential furnished by said electrical means in such a manner that the injection admission rate of said fuel injection means is determined by said time interval controlled by said control potential of said electrical means; and actuating means in circuit with said second timing means and with said electrically controllable fuel injection means for time controlling the operation of the latter, whereby said injection admission rate of said fuel injection means is regulated in a predetermined proportion to the rotational speed of said internal combustion engine.

8. A system as claimed in claim 7, wherein said variometer comprises one stationary coil in circuit with said auxiliary voltage supply means, and one coil located within the electro-magnetic field of said stationary coil and turnable from a position in which the axes of said coils are substantially parallel with each other into an angularly displaced position for varying the amount of electrical energy transmitted from said stationary coil to said turnable coil.

9. A system as claimed in claim 8, wherein said turnable coil is turnable by said torque transmitting means.

10. A system as claimed in claim 9, wherein said torque transmitting means comprises at least one primary rotatable magnetic member rotated by said rotary member of said engine, and a secondary rotatable conductive member located adjacent to but spaced from said primary member for being rotated by the latter through eddy currents produced in the former by the rotation of said primary member and electromagnetically coupling it therewith, said secondary member being mechanically connected with said turnable coil of said variometer, spring means being connected with said secondary members for counteracting to a predetermined degree the torque transmitted thereto and for returning it to normal position.

11. A system as claimed in claim 10, wherein said primary member is movable in the direction of its axis of rotation in such a manner that its axial displacement varies the amount of torque electromagnetically transmitted to said secondary member.

12. A system as claimed in claim 11, wherein said primary member is operatively connected with the air intake control means of said engine in such a manner that when the air intake rate of said engine is increased, said primary member is moved axially so that the amount of torque transmitted to said secondary member decreases and thus said control potential is increased and said time interval correspondingly prolonged, whereby said injection admission rate of said fuel injection means is regulated in a predetermined proportion to the rotational speed and to the air intake rate of said internal combustion engine.

No references cited.